Nov. 14, 1933.　　　　　C. S. ASH　　　　　1,934,677
METHOD OF TREATING FISH
Filed Sept. 2, 1930
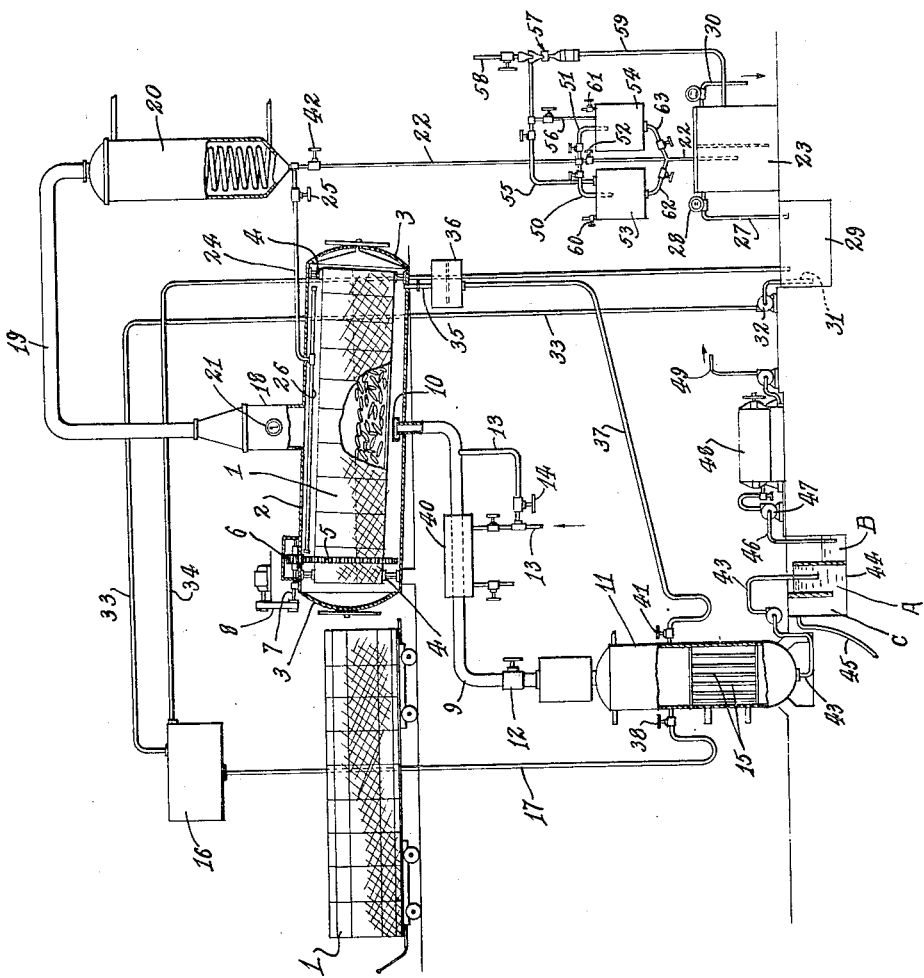
Inventor
Charles S. Ash
By Lyon & Lyon
Attorneys

UNITED STATES PATENT OFFICE 1,934,677

METHOD OF TREATING FISH

Charles S. Ash, San Francisco, Calif., assignor to California Packing Corporation, San Francisco, Calif., a corporation of New York Application September 2, 1930. Serial No. 479,387

5 Claims. (Cl. 99—5)

This invention relates to a method of treating fish and similar materials containing water and oil, and particularly relates to a method of treating waste fish and offal for the extraction of oils therefrom, and for the production of a substantially dry residual product adapted to be used for fertilizer and cattle feed and chicken feed.

Prior methods of treating fish, and particularly those portions of fish which are not used as food, consist of steaming the waste fish and offal, then pressing the same, thus removing most of the oil and soluble solids. This liquid, containing the oil and soluble solids together with some suspended solid materials, is allowed to stand, and separated into two layers. The oil floating to the top is drawn off, whereas the water containing the soluble solids is generally discarded. A similar separation between oil and water may be made by utilizing centrifugals.

The residual solids remaining after the pressing operation are then dried, generally in open rotary hot air driers, and then ground and sacked. During such drying, noxious odors are developed which effectively prevent the use of this process in proximity to human habitation. Furthermore, the fish meal becomes dark due to scorching and burning during the drying operation. As an alternative, drying in vacuum has been attempted, but this modification of the process is slow and expensive in operation, and costly in equipment, although it results in the production of a light colored meal having greated fertilizing and food value.

An object of this invention is to disclose and provide a process of treating waste fish by means of which a light colored, valuable, dry meal is obtained.

Another object is to disclose and provide a method by means of which waste fish products may be treated for the extraction of oil therefrom, in enclosed apparatus, thus preventing the generation or dissemination of noxious odors.

Another object is to disclose and provide a method by means of which waste fish and offal may be dried by producing an azeotropic mixture of a solvent and moisture in such offal.

A still further object is to disclose and provide a method of removing water from materials containing the same, by means of a solvent immiscible with water.

Other objects, uses and advantages of this invention will become apparent from the following detailed description of the preferred manner of carrying out the invention, reference being had to the appended drawing diagrammatically illustrating one form of apparatus which may be employed in carrying out the method of this invention.

Briefly stated, the method comprises the drying of waste fish offal by means of an oil solvent.

As shown in the drawing, waste fish, either before or after pressing, may be charged into wire containers 1, and such containers then admitted into a reaction or extraction chamber 2. Such extraction chamber 2 may be provided with large doors 3. The wire basket or container 1 may be supported within the extraction chamber 2 in circular rings 4, and driven by means of a spur gear 5 passing completely around the basket or container 1.

The gear 5 may be driven from a pinion 6 mounted upon a suitable shaft 7 extending from the extraction chamber 2 and driven in any suitable manner, as for example, by means of a belt 8 from a suitable source of power. This construction permits the entire container or basket 1 of waste fish and offal to be rotated within the extraction chamber, and thus thoroughly exposed to the action of solvent vapors.

The solvent vapors may be admitted to the reaction chamber 2 by means of a line 9 terminating in a distributing header 10 within the reaction zone 2. Such inlet means 9 may connect the header 10 with a still or colandria 11, and a valve 12 may be positioned in the conduit 9. Means for supplying steam to the header 10 may be provided, such as for example, a line 13 discharging into the conduit 9 and provided with a valve 14. The still or evaporator 11 may be supplied with heat at the bottom in any suitable manner, as for example, by means of steam coils or tubes 15.

A suitable solvent such as for example xylene, gasoline, mixtures of gasoline and xylene, methyl alcohol, ethyl alcohol, isopropyl alcohol or any solvent in which oil is soluble and which forms azeotropic mixtures with water may be supplied to the still or colandria 11 from a solvent storage tank 16 by means of a line 17.

The reaction or extraction chamber 2 may be provided with a dome 18 and a vapor outlet 19 leading to a suitable condenser 20. A suitable temperature indicating or recording means 21 is preferably positioned in the dome 18. The condenser 20 may discharge by line 22 into a Florentine separator 23. A branch line 24 provided with a valve 25 may lead from the discharge line 22 into a distributing header 26 within the reaction chamber or extraction zone 2.

The Florentine tank 23 may be provided with a discharge line 27 having a metering device 28 therein, the line 27 discharging into a sump 29. The other side of the Florentine tank 23 may be provided with a meter equipped discharge line 30 leading to a suitable drain or place of disposal.

Solvent discharged by the Florentine separator 23 through line 27 into the sump 29 may be withdrawn therefrom by line 31, pump 32 and conveyed by line 33 into the storage tank 16. An overflow line 34 may lead from the storage tank 16 back to the sump 29.

Liquids present in the reaction or extraction zone 2 may be removed therefrom by means of a drain pipe 35 and passed through a screen or trap 36, from whence the liquids may be conveyed as by means of line 37 to the still or evaporator 11.

In carrying out the method of this invention with the apparatus described hereinabove, and assuming that the container or basket 1 is filled with fish waste which has already been subjected to a pressing operation to remove substantially all of the oil, xylene or other suitable solvent or reagent capable of forming an azeotropic mixture with water is admitted into the still or evaporator 11 through the line 17 by opening the valve 38 in such line. Xylene has a boiling point of 139° C., and vapors of xylene are passed through the conduit 9 into the header 10, the valve 12 being open. The waste fish in the basket 1 within the extraction zone 2 is thus subjected to a current of reagent or solvent in vapor form, the vapors passing upwardly through the dome 18 and conduit 19 into the condenser 20.

Mixtures containing approximately 3 parts of xylene and 1 part of water have a boiling point of about 92° C. The vapors passing off from the extraction chamber 2 through the duct 19 will thus consist of a mixture of water and xylene inasmuch as an azeotropic mixture forms in the extraction chamber 2. These vapors are discharged into the condenser 20 wherein they are condensed and pass through line 22 to the Florentine separator 23.

In the Florentine separator 23 stratification takes place, the lighter solvent or free agent floating to the surface and passing off through the metered outlet line 27. The water settles to the bottom and passes into the adjoining portion of the Florentine separator and may be removed therefrom through the metered outlet 30. The solvent or other reagent may thus be discharged through line 27 into sump 29 and be returned to the tank 13 by lines 31 and 33 and pump 32.

The passage of the vapors of solvent or reagent through the rotating mass of fish offal in the extraction chamber 2 is continued until substantially all of the water present in the fish waste is removed. Substantial dehydration of the fish waste will be indicated by a rapid rise in temperature of the vapors passing through the dome 18, such rise in temperature being indicated by the thermometer 21. Furthermore, the termination of this dehydrating operation may also be judged by ascertaining the moisture content of the pressed fish waste on a small sample thereof, before being subjected to the process described hereinabove, the quantity of water withdrawn from the Florentine tank 23 through the metered outlet 30 furnishing a criterion as to the completeness with which the removal of water has been conducted.

The temperature of vapors supplied to the extraction chamber 2 may be maintained high by providing a steam jacket 40 around the conduit 9, such steam jacket being supplied with steam from line 13. Furthermore the temperature within the extraction chamber 2 may also be regulated by means of a steam jacket (not shown in the drawing).

After the water has been removed from the fish as described hereinabove, the distillation of xylene in the still or evaporator 11 may be discontinued. Valve 12 may be closed and superheated steam may be admitted to the extraction chamber 2 by opening valve 14 in line 13. Instead of employing super-heated steam, other heated gases such as air or nitrogen may be used. Super-heated steam is preferably employed, and in passing through the fish within the extraction chamber 2 any solvent retained in said fish is vaporized and driven off through the line 19.

The steam, together with the solvent or reagent is condensed in the condenser 20 and discharged into the Florentine tank 23, where separation between the water and solvent is obtained. The now substantially dehydrated fish meal may be withdrawn from the reaction chamber 2, and it will be found to be substantially dry and light in color.

As an illustration of the process described hereinabove, the following example is given of actual operating conditions: 224 pounds of fish meal containing 45% of water or 100 pounds of water, were treated with about 1525 pounds of solvent, such solvent consisting of a mixture of xylene in gasoline. The settling tank 23 at the termination of the run contained 1504 pounds of solvent, and 96 pounds of water. The loss of solvent, therefore, was 21 pounds, or merely 1.3% of the total quantity used. The removal of water from the fish meal was 96%. The meal was substantially dry and white in color. Upon being treated with petroleum ether it was found that the fish meal contained only a very small percentage of oil. The solvent recovered in the settling tank after such treatment contained some milky, gluey matter which settled with difficulty.

The apparatus and the process may be employed not only in drying previously pressed waste fish and offal, but also in extracting oil from the fish. For example, the extraction chamber 2, and particularly the baskets 1, may be supplied with fish cuttings and other similar organic materials containing both water and oil. Such organic materials may be subjected to the action of a reagent or solvent in vapor phase to remove water as described hereinabove, but after the rise in temperature indicated by the thermometer 21 indicates that all of the moisture has been removed, the supply of solvent vapors is discontinued.

A certain amount of condensation will now take place in the digestion or extraction chamber 2, the condensate thus formed consisting of a mixture or solution of solvent and fish oil. This condensate may be collected in the bottom of the digestion chamber and removed through the line 35, passing through the strainer 36 and then by line 37 and open valve 41 into the still or evaporator 11.

The vapors of solvent passing out through the dome 18 and conduit 19 are condensed in the condenser 20 as hereinbefore described, but the condensate instead of being sent to the Florentine tank 23 by line 22 may be sent through branch line 24, valve 42 being closed and valve 25 being open. The condensate will thus be distributed by headers 26 in the upper portion of the digestion chamber 22, thus subjecting the fish meal to the simultaneous action of the solvent vapors admitted through the lower header 10 and to the action of the condensed solvent from the distributor 26.

The completion of the oil extraction may be visually observed through a lantern or window in the return line 37, or by an examination of samples withdrawn from this line.

The fish oil will collect in the bottom of the still or evaporator 11 and may be withdrawn through line 43 into a separation tank 44. A certain amount of water may also be found in the lower portion of the evaporator 11, such water collecting there during the preceding dehydration of the fish meal or as condensate collected in the extraction chamber 2 during such preceding dehydration.

The oil or mixture of oil and water discharged from the bottom of the still or evaporator 11 into the central compartment A of the separator 44 may overflow into the compartment B, whereas the water may pass into the compartment C, from whence it may be withdrawn as by line 45. The oil from compartment B may be removed by a line 46 and passed by means of a pump 47 through a filter press 48 or other suitable clarifying apparatus from whence the purifying or clarifying oil may be discharged as by line 49 to a suitable storage.

The apparatus and method described hereinabove presupposes operation under atmospheric pressures, or pressures slightly above atmospheric which would normally exist in the system. If desired, however, the step of oil extraction may take place under superatmospheric pressures. By the use of vacuum lower temperatures may be employed, thus increasing the quality of the oil extracted from the fish meal or offal.

In using superatmospheric pressures the discharge line 22 from the condenser 20 may branch into lines 50 and 51, each of said lines being provided with a valve. The valve 52 placed in line 22 immediately below the branch lines 50 and 51 maye be closed. Lines 50 and 51 may lead to receivers 53 and 54 which are maintained under reduced pressure in any suitable manner. For example, the receivers 53 and 54 may be connected by means of valved lines 55 and 56 to an injector 57 supplied with water under pressure from a line 58. The injector may be connected by line 59 with the Florentine tank 23.

The receivers 53 and 54 may be supplied with pet cocks 60 and 61 and with valved discharge lines 62 and 63. By closing the valves in lines 51 and 63 the condensate from the condenser 20 may be passed into the receivers 53 and in this manner the receivers 53 and 54 may be utilized for alternately discharging their accumulated liquid contents into the Florentine tank 23 periodically. Pet cocks 60 and 61 may be used for breaking the vacuum.

It will thus be seen that a simple method has been provided by means of which fish or other organic substances containing water and oils may be dehydrated, or both dehydrated and oil freed in an enclosed system whereby noxious odors are not liberated. The solvent employed may be continuously used in cyclic operation of the process.

The effectiveness of this method of drying, coupled with the freedom from disagreeable odors, renders the method readily adaptable for use in thickly populated communities. Furthermore, the quality of the resulting dehydrated meal is greatly enhanced as the destructive effect of high temperatures is obviated.

Although a particular arrangement of various units has been described in the apparatus used hereinabove for illustrative purposes, it is to be understood that the invention is not limited thereto, as numerous modifications and changes may be made therein without departing from the scope of the invention. Furthermore, the method may be modified in various minor particulars and all such changes and modifications as come within the scope of the appended claims are embraced thereby.

I claim:

1. A method of treating fish and similar oil and water containing materials, comprising subjecting the fish in a treating zone to the action of a current of solvent in vapor form, said solvent being adapted to form an azeotropic mixture with water, maintaining the treating zone at a temperature adapted to vaporize an azeotropic mixture of water and solvent from said bone but insufficient to extract oil from said fish, withdrawing solvent and water vapors from such zone and condensing the same, separating water from the solvent, reusing the solvent in cyclic operation of the process, continuing to subject the dried fish to vapors of solvent, and then increasing the temperature in the treating zone so as to extract oil from the now dehydrated fish, withdrawing a solution of oil and solvent from the treating zone, and separating the oil from the solvent.

2. A method of treating organic materials containing oil and water, comprising subjecting the organic material in a treating zone to the action of a current of solvent in vapor form, said solvent being adapted to form an azeotropic mixture with water, maintaining the treating zone at a temperature adapted to vaporize an azeotropic mixture of solvent and water from said zone but insufficient to extract oil from said organic material, withdrawing solvent and water vapors from said zone and condensing the same, separating water from the solvent, reusing the solvent in cyclic operation of the process, and then continuing to subject the now dehydrated organic material to the action of a current of solvent in vapor form so as to extract oil from such material, withdrawing a solution of oil and solvent from the treating zone, and separating the oil from the solvent.

3. A method of treating organic materials containing water and oil, comprising subjecting the organic material in a treating zone to the action of xylene in vapor form at a temperature sufficient to vaporize an azeotropic mixture of xylene and water from such zone but insufficient to extract oil from said material, withdrawing vapors of water and xylene from said zone and condensing the same, separating water from the condensed xylene, reusing the xylene in cyclic operation of the process, and then continuing to subject the now dehydrated organic material to the action of a current of xylene vapors at a higher temperature so as to extract oil from such organic material, withdrawing a solution of oil and xylene from the treating zone and separating the oil from the xylene.

4. A method of treating organic substances containing water from which oil had been substantially removed, comprising subjecting organic material containing moisture to a current of reagent in vapor form at a temperature sufficient to form an azeotropic mixture with water, distilling an azeotropic mixture of water and reagent from the material without distilling residual oil from said material, condensing the vapors of water and reagent extracted from the material, and separating water from the reagent.

5. A method of treating waste fish from which oil had been previously extracted, comprising subjecting the substantially oil free fish during agitation in an extraction zone to the action of a current of xylene in vapor form at a temperature sufficient to form an azeotropic mixture of xylene with water, withdrawing xylene and water vapors from such zone at a temperature insufficient to extract oil from said waste fish and condensing the xylene and water vapors, and separating water from the condensed xylene.

CHARLES S. ASH.